(12) United States Patent
 Yamaguchi

(10) Patent No.: US 10,748,405 B2
(45) Date of Patent: Aug. 18, 2020

(54) DRIVING ASSISTANCE DEVICE

(71) Applicant: AISIN SEIKI KABUSHIKI KAISHA, Kariya (JP)

(72) Inventor: Hideaki Yamaguchi, Okazaki (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 16/302,307

(22) PCT Filed: Mar. 14, 2017

(86) PCT No.: PCT/JP2017/010269
§ 371 (c)(1),
(2) Date: Nov. 16, 2018

(87) PCT Pub. No.: WO2017/199563
PCT Pub. Date: Nov. 23, 2017

(65) Prior Publication Data
US 2019/0295400 A1    Sep. 26, 2019

(30) Foreign Application Priority Data

May 20, 2016    (JP) .................................. 2016-101146

(51) Int. Cl.
 *G08B 21/06*    (2006.01)
 *B60Q 9/00*    (2006.01)
 (Continued)

(52) U.S. Cl.
 CPC .............. *G08B 21/06* (2013.01); *B60K 28/06* (2013.01); *B60Q 9/00* (2013.01); *B60R 11/02* (2013.01);
 (Continued)

(58) Field of Classification Search
 CPC ............ B60K 28/066; B60W 2540/18; B60W 2540/22; B60W 2540/26; B60W 2550/22;
 (Continued)

(56) References Cited

U.S. PATENT DOCUMENTS 6,661,345 B1 * 12/2003 Bevan .................... G08B 21/06
   340/575
9,135,803 B1 *  9/2015 Fields .................. B60K 28/066
 (Continued)

FOREIGN PATENT DOCUMENTS

JP        9-91569 A      4/1997
JP     2010-186276 A     8/2010
 (Continued)

OTHER PUBLICATIONS

International Search Report dated Jun. 13, 2017 in PCT/JP2017/010269 filed Mar. 14, 2017.

*Primary Examiner* — Daniel Previl
(74) *Attorney, Agent, or Firm* — Oblon, McClelland, Maier & Neustadt, L.L.P.

(57) ABSTRACT

A driving assistance device of the embodiment includes: an acquisition unit that acquires a degree of drowsiness of a driver who is driving a vehicle, based on information on the driver being input; a calculation unit that calculates an expected time until the effect is lost indicating an expected time when drowsiness is not eliminated despite a stimulus being applied to the driver, based on a time interval when the degree of drowsiness obtained by the acquisition unit becomes equal to or more than a predetermined threshold; and a control unit that changes control performed on the driver as the expected time until the effect is lost calculated by the calculation unit is reduced.

7 Claims, 10 Drawing Sheets

(51) Int. Cl.
*G01C 21/34* (2006.01)
*B60K 28/06* (2006.01)
*G08G 1/16* (2006.01)
*B60R 21/00* (2006.01)
*B60R 11/02* (2006.01)

(52) U.S. Cl.
CPC .......... *B60R 21/00* (2013.01); *G01C 21/3484* (2013.01); *G08G 1/16* (2013.01)

(58) Field of Classification Search
CPC ........... B60W 2720/10; B60W 30/182; B60W 50/08; B60W 50/082; B60W 50/14; G02B 2027/0138; G02B 2027/014; G02B 2027/0141; G02B 2027/0178; G02B 2027/0187; G02B 27/0093; G02B 27/017; G02B 27/0172; G05D 1/0061; G05D 2201/0213; G06F 21/32; G06F 2203/011; G06F 3/013; G06F 3/017; G06F 3/0236; G06F 3/0304; G06F 3/04845; G06F 3/04886; G06K 9/00604; G06T 19/006; H04L 63/0861; H04N 5/23229; H04N 5/247; H04W 12/06; A61B 17/00491; A61B 17/0057; A61B 17/12118; A61B 17/12181; A61B 17/3468; A61B 18/18; A61B 2017/00411; A61B 2017/0065; A61B 2017/00876; A61B 2017/1205; A61F 2/82; B60Q 1/441

USPC .... 340/575, 439, 438, 576, 436, 425.1, 937, 340/573.1, 539.12, 539.13, 571, 683, 340/691.3, 691.6, 692, 5.53
See application file for complete search history.

(56) References Cited

U.S. PATENT DOCUMENTS

| | | | | |
|---|---|---|---|---|
| 10,155,445 | B2* | 12/2018 | Nemat-Nasser | B60K 28/066 |
| 2005/0126841 | A1* | 6/2005 | Isaji | B60K 28/066 |
| | | | | 180/272 |
| 2008/0238694 | A1* | 10/2008 | Ishida | A61B 5/163 |
| | | | | 340/575 |
| 2010/0214087 | A1* | 8/2010 | Nakagoshi | A61B 5/18 |
| | | | | 340/436 |
| 2013/0021463 | A1* | 1/2013 | Hatakeyama | A61B 5/18 |
| | | | | 348/78 |
| 2013/0113910 | A1* | 5/2013 | Kim | B60K 28/066 |
| | | | | 348/77 |
| 2016/0246298 | A1* | 8/2016 | Sato | B60Q 9/00 |

FOREIGN PATENT DOCUMENTS

| | | |
|---|---|---|
| JP | 2014-13496 A | 1/2014 |
| JP | 2014-75059 A | 4/2014 |
| JP | 2015-95141 A | 5/2015 |

* cited by examiner

FIG.5

| EXPECTED TIME UNTIL EFFECT IS LOST Tmax | ASSISTANCE LEVEL | AWAKENING STIMULUS | | RESTING GUIDANCE | |
|---|---|---|---|---|---|
| | | TIMING | STRENGTH | MESSAGE | RECOMMENDED REST AREA |
| T1≤Tmax | 1 | WHEN DROWSINESS LEVEL 3 APPEARS | WEAK | REFRESH YOURSELF BY TAKING A REST EARLY. | NO SUGGESTION |
| | | | | | REST AREA THAT CAN BE REACHED WITHIN REGULATED RATIO A% OF Tmax |
| T2≤Tmax<T1 | 2 | WHEN DROWSINESS LEVEL 3 APPEARS | STRONG | DIFFICULT TO OBTAIN AWAKENING ASSISTANCE EFFECT. PLEASE TAKE A REST. | REST AREA THAT CAN BE REACHED WITHIN REGULATED RATIO B% OF Tmax |
| T3≤Tmax<T2 | 3 | WHEN DROWSINESS LEVEL 2 APPEARS | STRONG | CANNOT OBTAIN AWAKENING ASSISTANCE EFFECT. TAKE A REST IMMEDIATELY. | NEAREST REST AREA |
| | | | | CLARIFY DURATION (SPOT) CAPABLE OF OBTAINING AWAKENING ASSISTANCE EFFECT | |
| Tmax<T3 | 4 | IMMEDIATELY | STRONG | DANGEROUS. STOP IMMEDIATELY. | - |
| | | | | AUTOMATICALLY REDUCE SPEED OF VEHICLE, CONTROL VEHICLE TO STOP | |

FIG.6

| EXPECTED TIME UNTIL EFFECT IS LOST $T_{max}$ | ASSISTANCE LEVEL | AWAKENING STIMULUS | | RESTING GUIDANCE | |
|---|---|---|---|---|---|
| | | TIMING | STRENGTH | MESSAGE | RECOMMENDED REST AREA |
| $T1 \leq T_{max}$ | 1 | WHEN DROWSINESS LEVEL 3 APPEARS (WHEN BUTTON IS PRESSED) | WEAK | REFRESH YOURSELF BY TAKING A REST EARLY. | NO SUGGESTION |
| | | | | | REST AREA THAT CAN BE REACHED WITHIN REGULATED RATIO A% OF $T_{max}$ |
| $T2 \leq T_{max} < T1$ | 2 | WHEN DROWSINESS LEVEL 3 APPEARS (WHEN BUTTON IS PRESSED) | STRONG | DIFFICULT TO OBTAIN AWAKENING ASSISTANCE EFFECT. PLEASE TAKE A REST. | REST AREA THAT CAN BE REACHED WITHIN REGULATED RATIO B% OF $T_{max}$ |
| $T3 \leq T_{max} < T2$ | 3 | APPLY AT SPECIFIC TIME INTERVAL | STRONG | CANNOT OBTAIN AWAKENING ASSISTANCE EFFECT. TAKE A REST IMMEDIATELY. | NEAREST REST AREA |
| | | | | CLARIFY DURATION (SPOT) CAPABLE OF OBTAINING AWAKENING ASSISTANCE EFFECT | |
| $T_{max} < T3$ | 4 | IMMEDIATELY | STRONG | DANGEROUS. STOP IMMEDIATELY. | - |
| | | | | AUTOMATICALLY REDUCE SPEED OF VEHICLE, CONTROL VEHICLE TO STOP | |

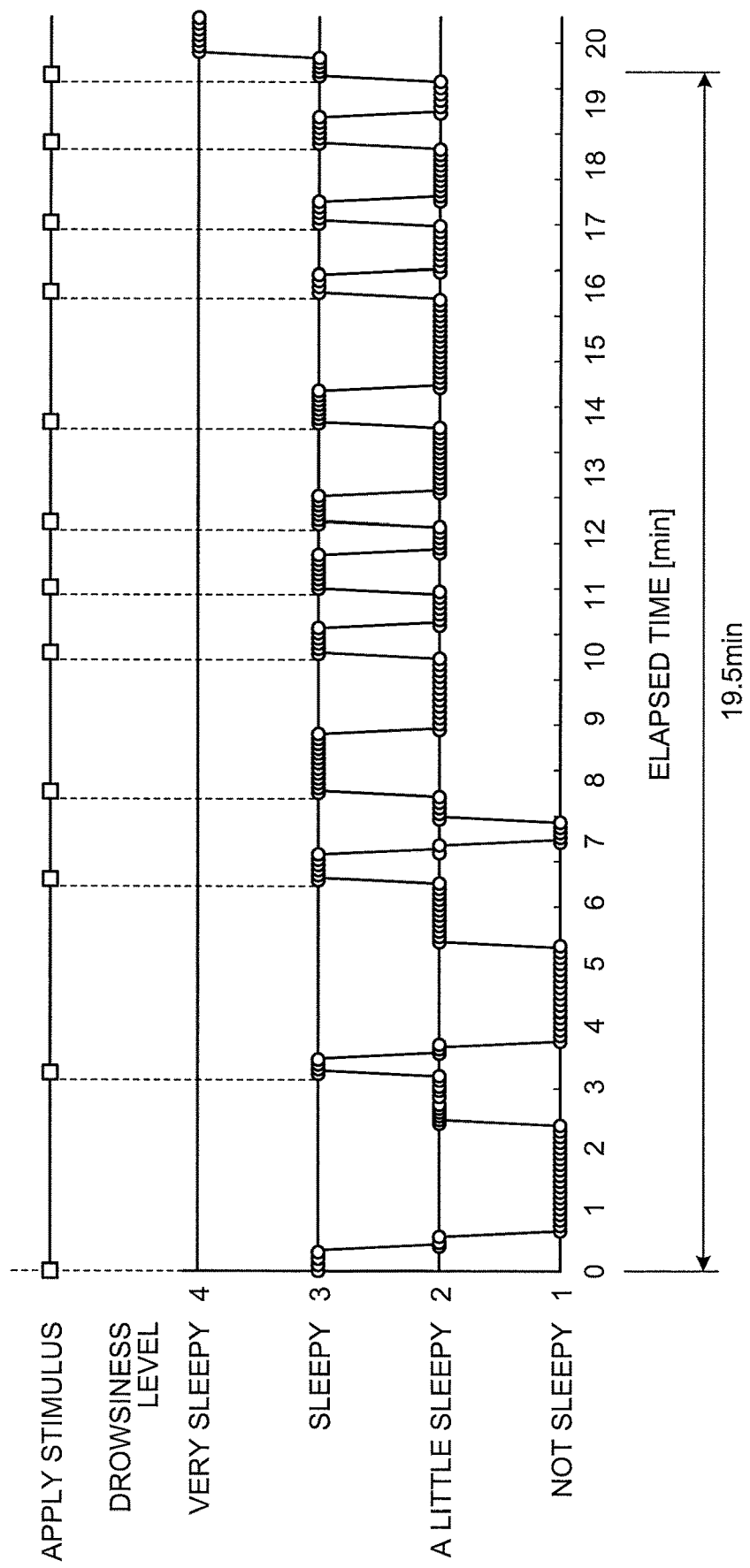

DRIVING ASSISTANCE DEVICE

CROSS-REFERENCE TO RELATED APPLICATIONS

This application is national stage application of International Application No. PCT/JP2017/010269, filed Mar. 14, 2017, which designates the United States, incorporated herein by reference, and which claims the benefit of priority from Japanese Patent Application No. 2016-101146, filed May 20, 2016, the entire contents of which are incorporated herein by reference.

TECHNICAL FIELD

The present invention relates to a driving assistance device.

BACKGROUND ART

Conventionally, a technology for detecting a degree of drowsiness of a driver, and applying a stimulus to the driver according to the detected degree of drowsiness has been proposed. By applying a stimulus to the driver, it is possible to awake the driver.

CITATION LIST

Patent Literature

Patent Document 1: Japanese Patent Application Laid-open No. 2010-186276
Patent Document 2: Japanese Patent Application Laid-open No. 2014-13496

SUMMARY OF INVENTION

Problem to be Solved by the Invention

However, in the conventional technology, the drowsiness eliminating effect on the driver is weakened, when a stimulus is repeatedly applied while drowsiness occurs.

It is an object of the present invention to provide a driving assistance device capable of maintaining the drowsiness eliminating effect on the driver.

Means for Solving Problem

For example, it is possible to extend the time until the effect of the process on the driver will be lost, by changing the process executed according to the expected time until the effect is lost.

For example, it is possible to improve the possibility of the driver to take a rest, because a rest station is suggested according to the expected time until the effect is lost.

For example, it is possible to improve the control accuracy on the basis of the expected time until the effect is lost, by calculating the expected time until the effect is lost according to the degree of drowsiness corresponding to the result of the pickup image of the driver.

For example, it is possible to improve the control accuracy on the basis of the expected time until the effect is lost, by calculating the expected time until the effect is lost on the basis of the operation performed by the driver.

For example, it is possible to extend the time until the effect of the process on the driver will be lost, because a threshold is set according to the degree of drowsiness of the driver.

BRIEF DESCRIPTION OF DRAWINGS

FIG. 1 is a perspective view illustrating a state when a part of a vehicle chamber of a vehicle according to an embodiment is seen through;
FIG. 5 is an exemplary diagram of process management database in which processes to be executed according to the detection result of a three-dimensional face model of the embodiment are associated with each other;
FIG. 6 is an exemplary diagram of the process management database in which processes to be executed according to the operation results by operation information of the embodiment are associated with each other;
FIG. 7 is an exemplary diagram of timing when a conventional awakening stimulus is applied.

DESCRIPTION OF EMBODIMENTS

Hereinafter, exemplary embodiments in which a driving assistance device of the present embodiment is mounted on a vehicle 1 will be described.

In the present embodiment, for example, the vehicle 1 may be an automobile that uses an internal combustion engine (engine, not illustrated) as a drive source (internal combustion engine automobile), an automobile that uses an electric motor (motor, not illustrated) as a drive source (electric automobile, fuel-cell automobile, and the like), or an automobile that uses the internal combustion engine and the electric motor as a drive source (hybrid automobile). Moreover, various transmissions may be mounted on the vehicle 1, and various devices (system, parts, and the like) required for driving the internal combustion engine and the electric motor may be mounted on the vehicle 1. Furthermore, the system, the quantity, the layout, and the like of the device relating to driving wheels 3 of the vehicle 1 may be set in various ways.

Figure 1:
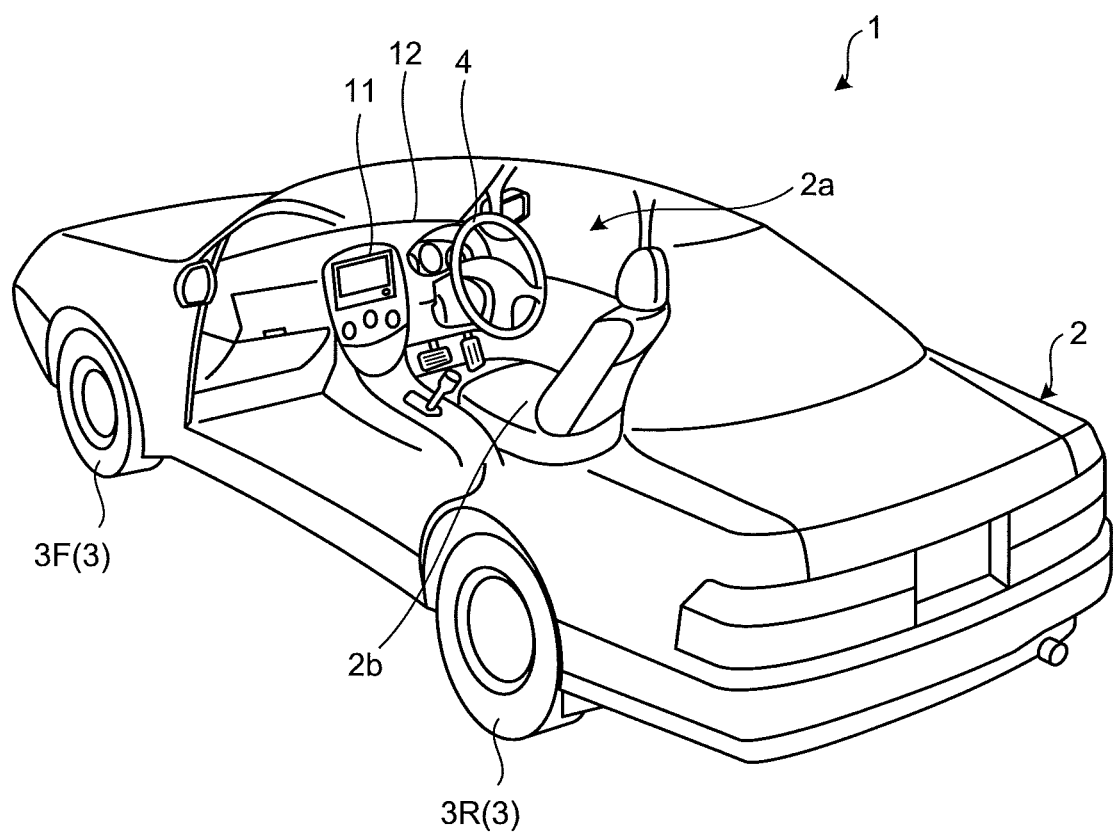

As illustrated in FIG. 1, a vehicle body 2 of the vehicle 1 configures a vehicle chamber 2a in which a driver (not illustrated) gets on. In the vehicle chamber 2a, a steering wheel unit 4 and the like are provided so as to face a seat 2b of the driver serving as a vehicle occupant. In the present embodiment, for example, the steering wheel unit 4 is a steering wheel projecting from a dashboard (instrument panel) 12.

Moreover, as illustrated in FIG. 1, in the present embodiment, for example, the vehicle 1 is a four-wheeler (fourwheeled automobile), and includes a pair of left and right front wheels 3F and a pair of left and right rear wheels 3R. Furthermore, in the present embodiment, the four wheels 3 are all configured in a steerable manner (steerably).

Still furthermore, a monitor device 11 is provided at the center portion of the dashboard 12 in the vehicle chamber 2a in the vehicle width direction, in other words, the left and right direction. The monitor device 11 includes a display device 8 and a sound output device 9. For example, the display device 8 is a liquid crystal display (LCD) and an organic electroluminescent display (OELD), and the like. For example, the sound output device 9 is a speaker. For example, the display device 8 is covered by a transparent operation input unit 10 such as a touch panel. The vehicle occupant can view an image displayed on a display screen of the display device 8 via the operation input unit 10. The vehicle occupant can also execute an input operation by operating the operation input unit 10 by touching, pushing, or moving the operation input unit 10 with a hand, a finger, or the like at a position corresponding to the image displayed on the display screen of the display device.

Figure 2:
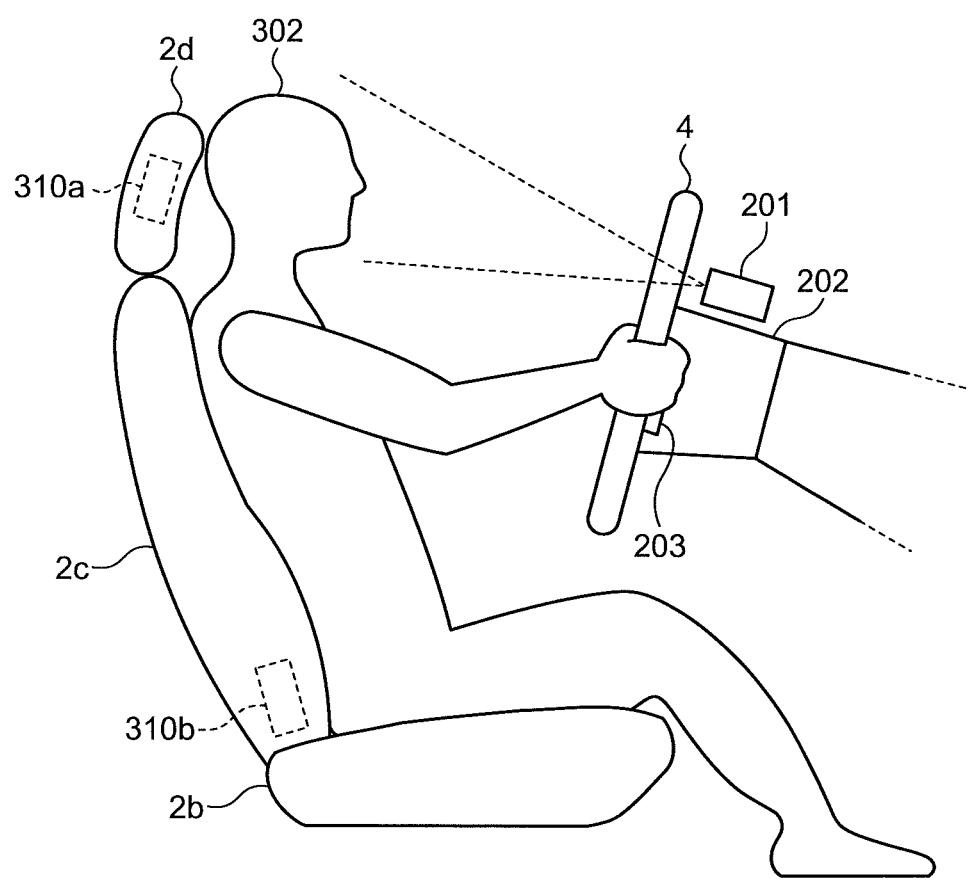
FIG. 2 is a diagram illustrating an example of how an image pickup device and an awakening stimulus output device according to the embodiment are disposed.

Still furthermore, as illustrated in FIG. 2, an image pickup device 201 is mounted on a steering wheel column 202. For example, the image pickup device 201 is a charge coupled device (CCD) camera or the like. The viewing angle and the posture of the image pickup device 201 is adjusted so that the face of a driver 302 who is seated on a seating portion of a seat 2b is placed in the center of the viewing field. The image pickup device 201 sequentially photographs images of the face of the driver 302, and sequentially outputs image data on the image obtained by photographing.

Still furthermore, as illustrated in FIG. 2, an awakening stimulus output device 310a is provided in a head rest portion 2d of the seat. The awakening stimulus output device 310a outputs an awakening stimulus for awakening the driver 302, to the driver 302, on the basis of stimulus data, which will be described below. In this example, the awakening stimulus includes an olfactory stimulation, an auditory stimulation, a tactile stimulation, a visual stimulation, and the like. However, it is not limited thereto.

A massage device 310b is provided in a back rest portion 2c of the seat. The massage device 310b vibrates the lower portion of the back rest portion 2c that comes into contact with the lumbar portion of the driver 302 on the basis of the stimulus data, and performs massage on the driver 302. The awakening stimulus output device 310a and the massage device 310b are examples of a stimulus output unit.

The arrangements of the awakening stimulus output device 310a and the massage device 310b are not limited to those illustrated in FIG. 2, and the awakening stimulus output device 310a and the massage device 310b may be arranged at positions at which a stimulus can be applied to the driver 302.

Moreover, an operation button 203 for notifying that the driver became drowsy is provided on the steering wheel unit 4. The driver presses the operation button 203 according to the degree of drowsiness.

Figure 3:
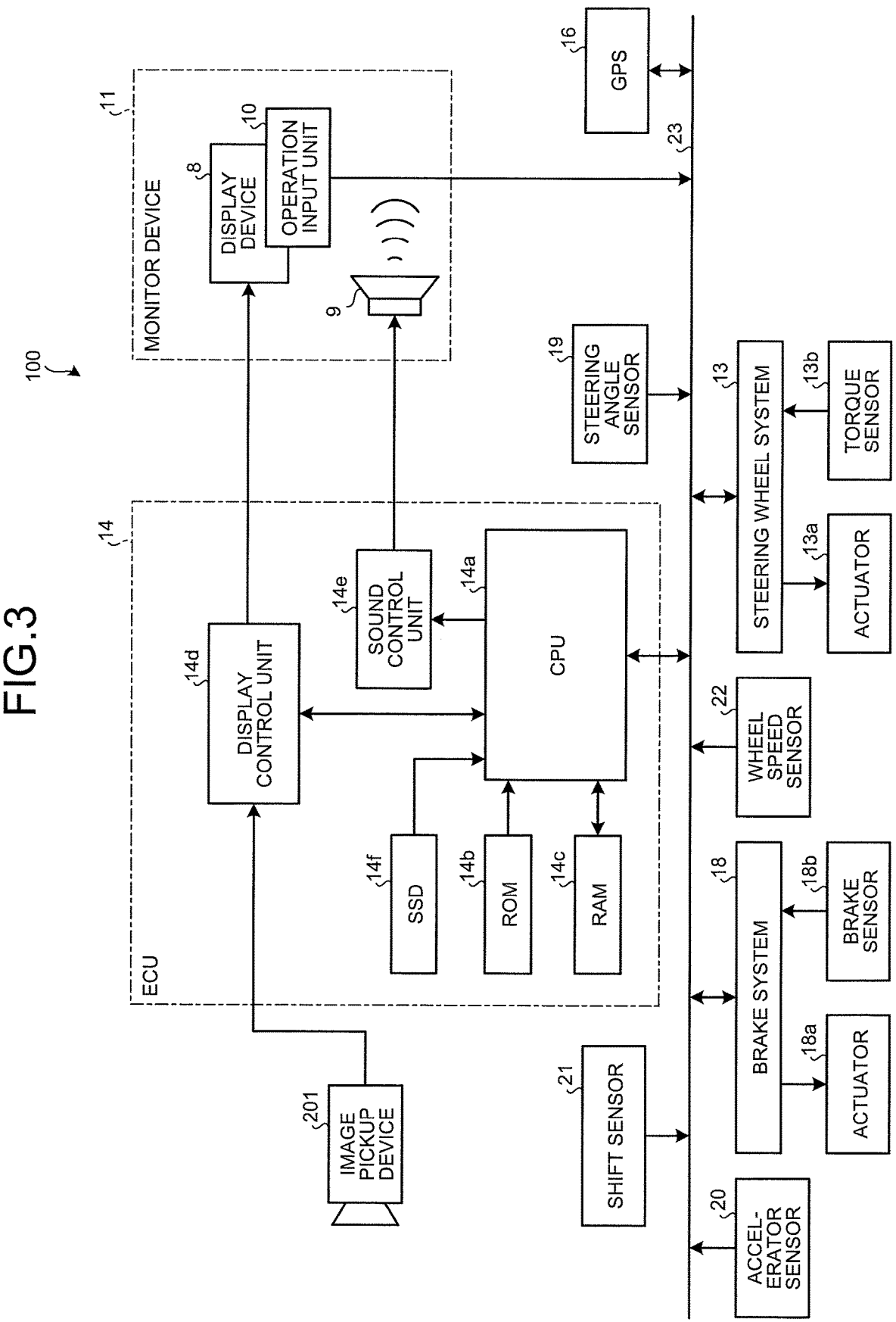
FIG. 3 is a block diagram illustrating an example of a configuration of a drowsy driving prevention system according to the embodiment.

Next, a drowsy driving prevention system including the driving assistance device of the vehicle 1 according to the present embodiment will be described. FIG. 3 is a block diagram illustrating an example of a configuration of a drowsy driving prevention system 100 according to the present embodiment. As illustrated in FIG. 3, in the drowsy driving prevention system 100, not only an electronic control unit (ECU) 14, the monitor device 11, a steering wheel system 13, a global positioning system (GPS) 16, and the like, but also a brake system 18, a steering angle sensor 19, an accelerator sensor 20, a shift sensor 21, a wheel speed sensor 22, and the like are electrically connected via an in-vehicle network 23 serving as an electric communication line. For example, the in-vehicle network 23 is configured as a controller area network (CAN). The ECU 14 can control the steering wheel system 13 including an actuator 13a, the brake system 18 including an actuator 18a, and the like, by sending a control signal through the in-vehicle network 23. Moreover, the ECU 14 can receive detection results of a torque sensor 13b, a brake sensor 18b, the steering angle sensor 19, the GPS 16, the shift sensor 21, the wheel speed sensor 22, and the like and an operation signal of the operation input unit and the like, via the in-vehicle network 23. In this example, the ECU 14 is an example of the driving assistance device.

For example, the ECU 14 includes a central processing unit (CPU) 14a, a read only memory (ROM) 14b, a random access memory (RAM) 14c, a display control unit 14d, a sound control unit 14e, a solid state drive (SSD; flash memory) 14f, and the like. The CPU 14a controls the entire vehicle 1. The CPU 14a can read out a program installed and stored in a nonvolatile storage device such as the ROM 14b, and execute an operation process according to the program. The RAM 14c temporarily stores therein various data used in the calculation performed by the CPU 14a. Moreover, the display control unit 14d combines image data displayed on the display device 8 and the like, among operation processes performed by the ECU 14. Moreover, the sound control unit 14e mainly executes a process on the sound data output by the sound output device 9, among operation processes performed by the ECU 14. Moreover, the SSD 14f is a rewritable nonvolatile storage unit, and can store data even if the power of the ECU 14 is turned OFF. The CPU 14a, the ROM 14b, the RAM 14c, and the like may be accumulated in the same package. Moreover, in the ECU 14, another logical operation processor such as a digital signal processor (DSP), a logical circuit, and the like may be used instead of the CPU 14a. Furthermore, a hard disk drive (HDD) may be provided instead of the SSD 14f, and the SSD 14f and the HDD may be separately provided from the ECU 14.

The configurations, arrangements, electric connection mode, and the like of the various sensors and the actuators described above are merely examples, and may be set (changed) in various manners.

Figure 4:
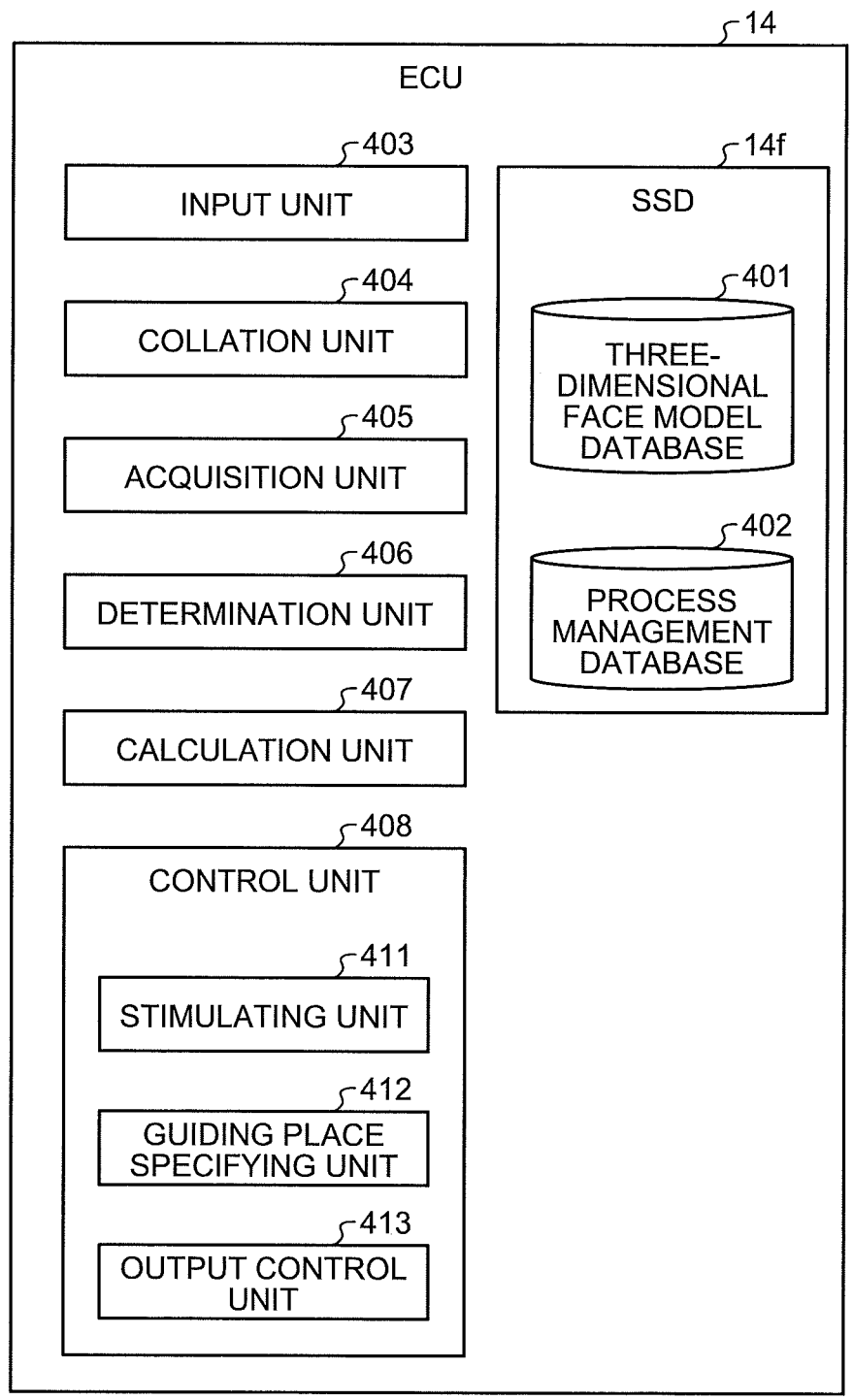
FIG. 4 is a block diagram illustrating a functional configuration of an ECU of the embodiment.

FIG. 4 is a block diagram illustrating a functional configuration of the ECU 14 of the present embodiment. As illustrated in FIG. 4, the SSD 14f stores therein three-dimensional face model database 401 and process management database 402. The ECU 14 includes an input unit 403, a collation unit 404, an acquisition unit 405, a determination unit 406, a calculation unit 407, and a control unit 408. These configurations are implemented when the CPU 14a executes the program stored in the SSD 14f. However, these configurations may also be implemented by hardware such as an electronic circuit.

The input unit 403 inputs information on the driver from outside. In the present embodiment, the input unit 403 inputs image data of a driver taken by the image pickup device 201 as information on the driver. Moreover, the input unit 403 inputs operation information indicating whether the operation button 203 of the steering wheel unit 4 is pressed, as the information on the driver.

The three-dimensional face model database 401 stores a three-dimensional face model serving as a statistical face shape model. A three-dimensional face shape of an average research subject, positions of facial parts such as eyes, mouth, nose, and the like of the research subject, and change information on the shape of the eyes of the research subject are registered in the three-dimensional face model. For example, a constrained local model (CLM), an active appearance model (AAM), an active shape model (ASM) may be used as the three-dimensional face model. However, it is not limited thereto.

Furthermore, change information is registered in the three-dimensional face model. The change information is data in which a stepwise change of the shape of the eyes of the driver according to the change in the facial expression and motion of the driver is associated with a shape parameter at each step. More specifically, a state in which the driver's face is inexpressive, facing front, and the eyes are opened is set as a standard state. Then, each state of stepwise changes of the shape of the eyes from the standard state to when the eyes are closed is associated with the shape parameter, and registered in the three-dimensional face model, as the change state.

The collation unit 404 extracts facial shapes of a plurality of research subjects, and feature points of facial parts such as eyes and a mouth, from the obtained pickup image, and matches the two-dimensional pickup image of the driver with the three-dimensional facial structure data that configures the three-dimensional face model. In other words, the collation unit 404 performs model fitting and tracks the model. Consequently, the collation unit 404 specifies (estimates) the orientation of the face of the driver, and searches and specifies (estimates) the position of the eyes on the three-dimensional face model. Moreover, the collation unit 404 detects the specified (estimated) facial orientation of the driver and the position of the eyes of the driver, and specifies an eye opening degree that is distance between the upper and lower eyelids of the driver, and the like.

The acquisition unit 405 of the present embodiment acquires drowsiness level (degree of drowsiness) of the driver, from the three-dimensional face model collated by the collation unit 404, the eye opening degree of the three-dimensional face model, and the like. The determination method of the drowsiness level based on the three-dimensional face model is not limited to known methods and any desired method may be used.

The acquisition unit 405 of the present embodiment acquires the drowsiness level of the driver on the basis of operation information input by the input unit 403. The operation information is information indicating whether the operation button 203, which is pressed when the driver becomes drowsy, is pressed. Thus, the acquisition unit 405 determines the drowsiness level of the driver on the basis of the operation information. For example, the determination method of the drowsiness level based on pressing the operation button 203 includes a method in which a "sleepy" button is provided on the operation button 203, and the acquisition unit 405 determines the drowsiness level according to the type of the button to be pressed. For example, the acquisition unit 405 determines that the drowsiness level is 3, when the "sleepy" button is pressed. In the present embodiment, the button to be pressed is not limited to the "sleepy" button, and a plurality of types of buttons such as "sleepy" and "a little sleepy" buttons may also be provided.

The present embodiment describes an example in which the three-dimensional face model generated from the image data and the operation information are used to obtain the drowsiness level. However, it is not limited to these information, and the drowsiness level may also be obtained as long as the information on the driver is used.

The process management database 402 is database for managing the process when the drowsiness is detected. The process management database 402 of the present embodiment manages the process corresponding to the detection result of the three-dimensional face model and the process corresponding to the operation information.

FIG. 5 is an exemplary diagram of process management database in which processes to be executed according to the detection results of the three-dimensional face model of the present embodiment are associated with each other. As illustrated in FIG. 5, an expected time until the effect is lost, an assistance level, an awakening stimulus, and resting guidance are stored in an associated manner.

The expected time until the effect is lost is an expected length of time until the drowsiness of the driver will not be eliminated by the awakening stimulus, in other words, the effect by the awakening stimulus will be lost, despite the awakening stimulus repeatedly being applied to the driver. In the present embodiment, the calculation unit 407 calculates the expected time until the effect is lost, on the basis of a time interval when the drowsiness level obtained by the acquisition unit 405 becomes a predetermined threshold (for example, drowsiness level 3 or drowsiness level 2).

In the present embodiment, the control executed by the control unit 408 is changed as the expected time until the effect is lost is reduced. In FIG. 5, types of the control to be executed are defined as the assistance level, the awakening stimulus, and the resting guidance. In FIG. 5, the assistance level, the awakening stimulus, and the resting guidance are stored associated with the expected time until the effect is lost. Consequently, it is possible to implement the control according to the expected time until the effect is lost.

The assistance level indicates a degree of control executed by the control unit 408. In the present embodiment, the assistance level is set to increase as the expected time until the effect is lost is reduced.

In the awakening stimulus, the awakening stimulus to be applied to the driver is defined, and timing and the strength are associated therewith. The timing indicates timing to apply the awakening stimulus. For example, "when drowsiness level 3 appears" is timing when the drowsiness level 3 is detected from the three-dimensional face model. "Immediately" indicates that the awakening stimulus is continuously applied. The strength indicates the strength of the awakening stimulus to be applied to the driver.

In the resting guidance, information used for guiding the driver to the rest station of the vehicle 1 is defined, and a message and a recommended rest area are associated therewith. The message is set for each assistance level, in other words, for each expected time until the effect is lost. In the recommended rest area, information required for suggesting a rest area to the driver is defined, on the basis of the current vehicle 1 and the assistance level. For example, A % is defined as 50%, and for example, B % is defined as 20% to 30%. Moreover, in the present embodiment, a plurality of candidates of the rest station within the range are suggested.

FIG. 6 is an exemplary diagram of the process management database in which processes to be executed according to the operation results by the operation information, of the present embodiment, are associated with each other. In FIG. 6, similar to FIG. 5, the expected time until the effect is lost, the assistance level, the awakening stimulus, and the resting guidance are stored in an associated manner. In FIG. 6, the timing to apply the awakening stimulus is different from that in FIG. 5. In the example illustrated in FIG. 5, the timing to apply the awakening stimulus is timing when a predetermined drowsiness level is detected in the three-dimensional face model that is tracking results of the face of the driver. Alternatively, in the example illustrated in FIG. 6, the timing to apply the awakening stimulus is timing when the operation button 203 is pressed. In other words, the timing when a certain operation button 203 is pressed is considered as the time when the drowsiness level 3 appears, and the awakening stimulus is applied at the timing. Moreover, when the assistance level has reached 3, the awakening stimulus is applied at a specific time interval, regardless of whether the operation button 203 is pressed. When the assistance level has reached 4, the awakening stimulus is continuously applied.

The determination unit 406 determines whether the drowsiness level becomes equal to or more than a predetermined threshold. The predetermined threshold is changed according to the assistance level (in other words, expected time of effect). For example, to detect the drowsiness level from the three-dimensional face model, the determination unit 406 uses the drowsiness level 3 as the threshold in the assistance levels 1 to 2, and uses the drowsiness level 2 as the threshold in the assistance level 3.

In other words, in the present embodiment, the drowsiness level 3 may be detected in the assistance levels 1 to 2, because the driver is still awake. However, the drowsiness level of an earlier stage, in other words, the drowsiness level 2 is detected in the assistance level 3, because the driver is getting difficult to stay awake. When the drowsiness level serving as the threshold is detected, the control for maintaining the awakened state is performed.

For example, to detect the drowsiness level from the operation information, the determination unit 406 uses the drowsiness level 3 as the threshold, regardless of the assistance level. In other words, the determination unit 406 determines the timing when the operation button 203 is pressed, as the timing when the drowsiness level becomes equal to or more than the drowsiness level 3.

The calculation unit 407 calculates the expected time until the effect is lost, on the basis of a time interval from when the determination unit 406 detects the drowsiness level equal to or more than a predetermined threshold at the last time, to when the determination unit 406 detects the drowsiness level equal to or more than a predetermined threshold at this time. Formula (1) is a formula for calculating expected time Tmax until the effect is lost.

$$T\max = \alpha1 \times \text{time interval} + \beta1 \qquad (1)$$

Parameter $\alpha1$ and $\beta1$ are parameters stored in the SSD 14*f*, and are defined according to the embodiments. The parameters $\alpha1$ and $\beta1$ may also be adjusted according to the measurement results of the driver to the present. In other words, the ECU 14 measures the transition of the drowsiness level of the driver to the present, and stores the results in the SSD 14*f*. The ECU 14 then adjusts the parameters $\alpha1$ and $\beta1$ so that the parameters $\alpha1$ and $\beta1$ are matched with the transition of the measured drowsiness level. Consequently, it is possible to improve the calculation accuracy of the expected time Tmax until the effect is lost according to the drowsiness level detected this time.

Moreover, in the present embodiment, a method of calculating the expected time Tmax until the effect is lost is not limited to that using the formula (1) described above, and the expected time Tmax until the effect is lost may also be calculated using another formula. As a modification, a method of calculating the expected time Tmax until the effect is lost using the following formula (2) may be used.

$$T\max = \alpha2 \times \text{time interval} + \alpha3 \times \text{drowsiness level detected this time} + \beta2 \qquad (2)$$

The parameters $\alpha2$, $\alpha3$, and $\beta2$ are parameters stored in the SSD 14*f* and are defined according to the embodiments. Moreover, the parameters $\alpha2$, $\alpha3$, and $\beta2$ may also be adjusted according to the measurement results of the driver.

The control unit 408 includes a stimulating unit 411, a guiding place specifying unit 412, and an output control unit 413. The control unit 408 sets the assistance level on the basis of the expected time until the effect is lost calculated by the calculation unit 407. The stimulating unit 411, the guiding place specifying unit 412, and the output control unit 413 then perform control according to the set assistance level. In other words, the configurations of the control unit 408 change the control to be performed on the driver, as the expected time until the effect is lost is reduced.

Conventionally, the awakening stimulus is applied when the drowsiness level becomes equal to or more than a predetermined threshold. FIG. 7 is an exemplary diagram of timing when a conventional awakening stimulus is applied. In the example illustrated in FIG. 7, an awakening stimulus is applied when the drowsiness level 3 is detected. In the example illustrated in FIG. 7, the time interval during which the drowsiness level 3 is detected is gradually reduced, and then the drowsiness level 4 is detected. The drowsiness level 4 indicates a degree of drowsiness that the driver is difficult to stay awake, in other words, the driver is difficult to drive, despite the awakening stimulus being applied. In the example illustrated in FIG. 7, the effect losing time from when the drowsiness level 3 is detected first to when the drowsiness level 4 is detected is 19.5 minutes.

On the other hand, the control unit 408 of the present embodiment sets the assistance level according to the calculated expected time until the effect is lost, and controls to extend the effect losing time by performing control according to the assistance level.

The stimulating unit 411 applies awakening stimulus to the driver at the strength associated with the assistance level, at the timing associated with the assistance level set according to the expected time until the effect is lost. The stimulating unit 411 of the present embodiment can apply the awakening stimulus to the driver, by controlling the awakening stimulus output device 310*a* and the massage device 310*b*.

The guiding place specifying unit 412 specifies the candidate of the rest station to guide the vehicle 1, on the basis of the recommended rest area associated with the assistance level and the current position of the vehicle 1 obtained by the GPS 16.

For example, in the assistance level 1, the guiding place specifying unit 412 calculates a movable distance of the vehicle 1, using the expected time Tmax until the effect is lost×A % (for example, 50%)×average speed of the vehicle 1. The guiding place specifying unit 412 then specifies the places that the driver can take a rest within the movable distance of the vehicle 1 from the current location of the vehicle 1, as the candidate of the rest station, in the passage the current vehicle 1 is currently traveling.

For example, in the assistance level 2, the guiding place specifying unit 412 calculates the movable distance of the vehicle 1, using the expected time Tmax until the effect is lost×B % (for example, 20 to 30%)×average speed of the vehicle 1. The same procedure as that of the assistance level 1 then takes place.

Figure 8:
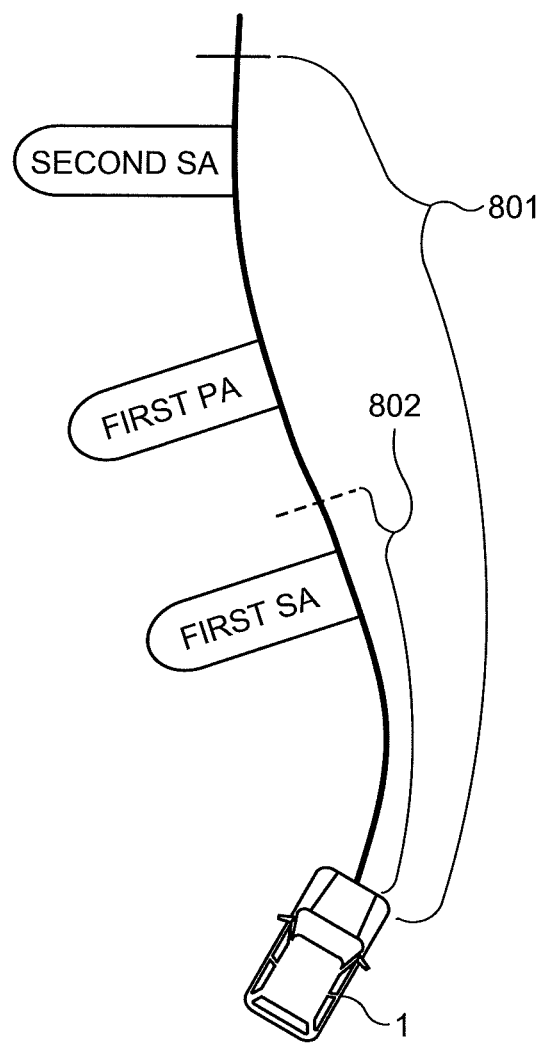
FIG. 8 is an exemplary diagram of candidates of a rest station specified by a guiding place specifying unit of the embodiment.

FIG. 8 is an exemplary diagram of candidates of the rest station specified by the guiding place specifying unit 412 of the present embodiment.

As illustrated in FIG. 8, in the assistance level 1, the guiding place specifying unit 412 specifies a first service area (SA), a first parking area (PA), and a second SA that are present within a movable distance 801 of the vehicle 1 that is calculated using the expected time Tmax until the effect is lost×A % (for example, 50%)×average speed of the vehicle 1, as the candidates of the rest station. Alternatively, in the assistance level 2, the guiding place specifying unit 412 specifies the first SA that is present within a movable distance 802 of the vehicle 1 that is calculated using the expected time Tmax until the effect is lost×B % (for example, 20 to 30%)×average speed of the vehicle 1, as the candidate of the rest station.

The output control unit 413 outputs a message associated with the assistance level set according to the expected time until the effect is lost, from the sound output device 9.

Moreover, the output control unit 413 outputs the candidate of the rest station specified by the guiding place specifying unit 412 to the display device 8.

The output control unit 413 may output a message at any desired timing such as at the timing of applying awakening stimulus. As another example, the output control unit 413 may output a message at every certain period, or may change the output frequency according to the assistance level. The candidate of the rest station may be continuously displayed on the display device 8, or may be displayed alternately with a map or the like. As the display method of the candidate of the rest station, the candidate of the rest station and the distance to the rest station may be displayed with characters, or the rest station may be displayed on the map.

Figure 9:
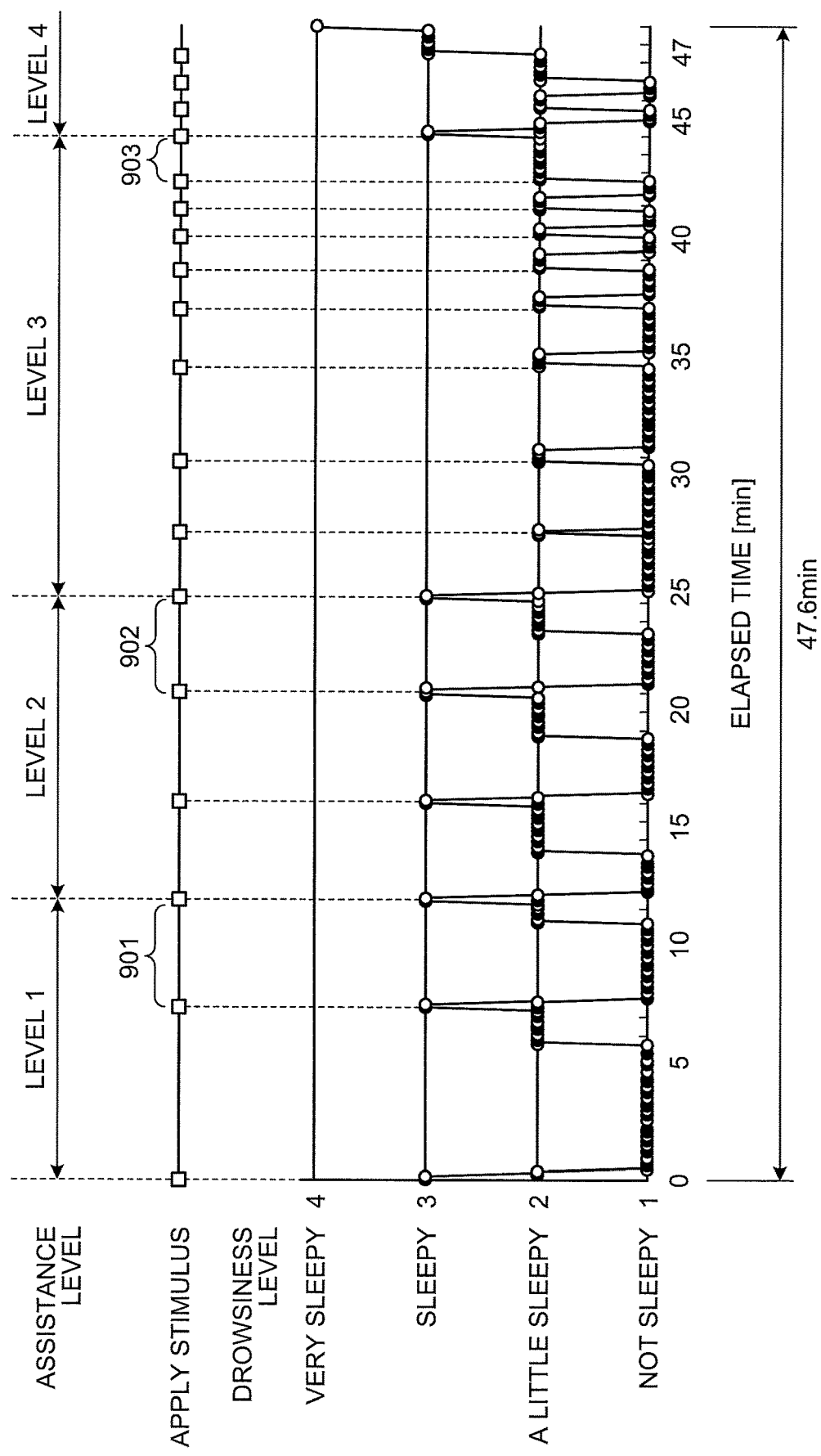
FIG. 9 is an exemplary diagram of timings at which the ECU of the embodiment applies an awakening stimulus and the assistance levels.

FIG. 9 is an exemplary diagram of timings at which the ECU 14 of the present embodiment applies the awakening stimulus and the assistance levels. In the example illustrated in FIG. 9, the drowsiness level is detected from the three-dimensional face model. Then, as illustrated in FIG. 5, in the assistance levels 1 to 2, the awakening stimulus is applied at the timing when the drowsiness level 3 is detected, and in the assistance level 3, the awakening stimulus is applied at the timing when the drowsiness level 2 is detected.

In the control unit 408, the stimulating unit 411 applies a weak awakening stimulus to the driver, at the timing when the drowsiness level 3 is detected while the expected time Tmax until the effect is lost is equal to or more than a threshold T1 and the assistance level is 1, and the output control unit 413 controls to output a message "Refresh yourself by taking a rest early". Moreover, the output control unit 413 guides the place that the vehicle 1 can reach within 50% of the expected time Tmax until the effect is lost, as the candidate of the rest station.

In the assistance levels 1 to 2, the control unit 408 then determines whether to change the assistance level, on the basis of the time interval during which the drowsiness level 3 is detected. In the example illustrated in FIG. 9, the control unit 408 switches to the assistance level 2, when the expected time Tmax until the effect is lost calculated on the basis of a time interval 901 becomes smaller than the threshold T1 (see FIG. 5).

In the control unit 408, in the assistance level 2, the stimulating unit 411 applies a strong awakening stimulus to the driver at the timing when the drowsiness level 3 is detected, and the output control unit 413 controls to output a message "Difficult to obtain awakening assistance effect. Please take a rest". The output control unit 413 then guides the places that the vehicle 1 can reach within 20 to 30% of the expected time Tmax until the effect is lost, as the candidate of the rest station.

Moreover, the control unit 408 switches to the assistance level 3, when the expected time Tmax until the effect is lost calculated on the basis of the time interval 902 becomes smaller than a threshold T2 (see FIG. 5).

In the control unit 408, in the assistance level 3, the stimulating unit 411 applies a strong awakening stimulus to the driver at the timing when the drowsiness level 2 is detected, and the output control unit 413 controls to output a message "Cannot obtain awakening assistance effect. Take a rest immediately". The output control unit 413 also guides the nearest rest station. Moreover, the output control unit 413 may clarify the duration during which the awakening assistance effect is obtained.

The control unit 408 switches to the assistance level 4, when the expected time Tmax until the effect is lost calculated on the basis of a time interval 903 from when the drowsiness level 2 is detected to when the drowsiness level 3 is detected becomes less than a threshold T3, during the assistance level 3 (see FIG. 5).

In the control unit 408, in the assistance level 4, the stimulating unit 411 continues to apply a strong awakening stimulus, and the output control unit 413 controls to output a message "Dangerous. Stop immediately". According to the need, the control unit 408 may also perform automatic deceleration of the vehicle 1 or control the vehicle 1 to stop.

In the example illustrated in FIG. 9, the effect losing time from when the drowsiness level 3 is detected first to when the drowsiness level 4 is detected is 47.6 minutes. Compared with the conventional example, the present embodiment can extend the time until the effect of the awakening stimulus is lost, by changing the strength of the stimulus and timing of applying the stimulus, according to the assistance level, in other words, the expected time until the effect is lost.

In the present embodiment, the awakening stimulus is applied when the drowsiness level becomes equal to or more than a predetermined threshold, and the expected time until the effect is lost is calculated at the timing when the awakening stimulus is applied. The assistance level is set according to the expected time until the effect is lost. Then, the timing to apply the awakening stimulus and the strength of the stimulus are defined according to the assistance level, and the rest station at a suitable timing is displayed.

Figure 10:
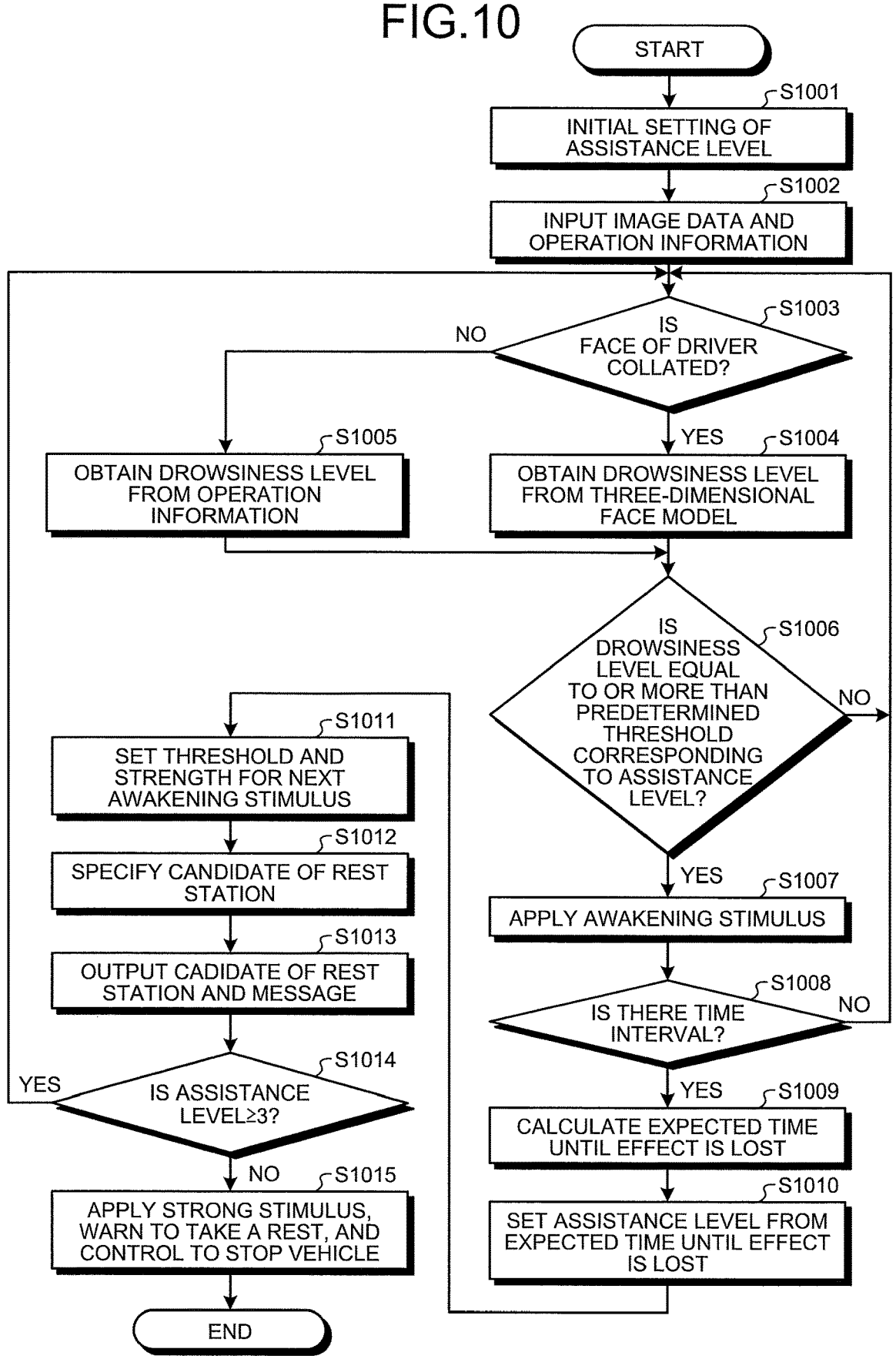
FIG. 10 is a flowchart illustrating a procedure of a drowsy driving prevention process by the ECU of the embodiment.

Next, a drowsy driving prevention process of the ECU 14 of the present embodiment will be described. FIG. 10 is a flowchart illustrating a procedure of the process described above by the ECU 14 of the present embodiment.

As illustrated in FIG. 10, the control unit 408 performs an initial setting of an assistance level (S1001). In the present embodiment, the assistance level 1 is set as the initial setting.

Next, the input unit 403 inputs the image data picked up by the image pickup device 201 and operation information indicating whether the operation button 203 is pressed (S1002).

Next, the collation unit 404 determines whether the face of the driver is collated from the input image data (S1003).

When it is determined that the face of the driver is collated (Yes at S1003), the acquisition unit 405 obtains the drowsiness level of the driver from the three-dimensional face model of the driver specified from the image data (S1004).

On the other hand, when it is determined that the face of the driver is not collated (No at S1003), the acquisition unit 405 obtains the drowsiness level of the driver from the operation information (S1005). In the present embodiment, it is regraded that the drowsiness level 3 is detected at the timing when the operation button 203 is pressed.

The determination unit 406 determines whether the obtained drowsiness level is equal to or more than a predetermined threshold corresponding to the assistance level (S1006). In the present embodiment, in the assistance levels 1 to 2, the drowsiness level 3 becomes the threshold. Moreover, in the assistance level 3, the threshold differs according to whether the drowsiness level is obtained from the three-dimensional face model. When the drowsiness level is obtained from the three-dimensional face model, the drowsiness level 2 becomes the threshold. When the drowsiness level is obtained from the operation information, the drowsiness level 3 becomes the threshold. When it is determined that the drowsiness level is not equal to or more than a predetermined threshold corresponding to the assistance level (No at S1006), the determination unit 406 performs the process again from S1003.

On the other hand, when the determination unit 406 determines that the drowsiness level is equal to or more than the predetermined threshold corresponding to the assistance level (Yes at S1006), the stimulating unit 411 applies the awakening stimulus corresponding to the assistance level to the driver (S1007). However, when the assistance level is 3 and the drowsiness level is detected on the basis of the operation information, the stimulating unit 411 applies the awakening stimulus at every specific time interval, instead of detecting the drowsiness level.

The calculation unit 407 then determines whether there is a time interval from when the drowsiness level equal to or more than the threshold is detected the last time to when the drowsiness level equal to or more than the threshold is detected this time (S1008). When there is no time interval, in other words, when the drowsiness level equal to or more than the threshold is detected first this time (No at S1008), the process is performed again from S1003. In the present embodiment, in the assistance levels 1 and 2, the awakening stimulus is applied at the timing when the drowsiness level equal to or more than the threshold is detected. Consequently, the time interval during which the drowsiness level equal to or more than the threshold is detected may also be referred to as the time interval during which the awakening stimulus is applied.

On the other hand, when it is determined that there is a time interval (Yes at S1008), the calculation unit 407 calculates the expected time until the effect is lost on the basis of the time interval (S1009).

The control unit 408 then sets the assistance level on the basis of the calculated expected time until the effect is lost (S1010).

The control unit 408 then sets the threshold (timing to apply the awakening stimulus) associated with the assistance level and the strength used for applying the next awakening stimulus (S1011).

The guiding place specifying unit 412 calculates the movable distance of the vehicle 1 on the basis of the expected time until the effect is lost, and specifies the candidate of the rest station present within the distance (S1012).

The output control unit 413 then outputs the candidate of the specified rest station on the display device 8, and outputs a message corresponding to the assistance level (S1013).

The control unit 408 then determines whether the assistance level is equal to or less than 3 (S1014). When it is determined that the assistance level is equal to or less than 3 (Yes at S1014), the process is performed again from S1003.

On the other hand, in the control unit 408, when it is determined that the assistance level is larger than 3 (assistance level is 4) (No at S1014), the stimulating unit 411 continuously applies a strong stimulus, the output control unit 413 outputs a warning message to take a rest, and the control unit 408 controls to stop the vehicle 1 according to the need (S1015).

In this manner, in the embodiment described above, the expected time until the effect is lost is calculated, and the process to be executed is changed according to the difference in the expected time until the effect is lost. For example, by applying strength to the content of the resting guidance according to the expected time until the effect is lost, it is possible to reduce a sensory gap between the need of choosing to take a rest felt by the driver and a real need of choosing to take the rest. By changing the message and the rest station output by the output control unit 413 according to the expected time until the effect is lost, it is possible to improve the persuasive power of the need to take a rest. Consequently, it is possible to improve the possibility of the driver to choose to take a rest.

Conventionally, when a stimulus is applied, there is a possibility that the driver does not choose to take a rest, because drowsiness is eliminated by the stimulus. In the present embodiment, it is possible to suggest a rest station that fits the feeling of a driver, by changing the candidate of the rest station to be suggested according to the expected time until the effect is lost. Consequently, it is possible to increase the possibility of choosing to take a rest.

In the present embodiment, it is possible to implement a suitable assistance that results in extending the time until the effect of the process (for example, awakening stimulant) on the driver will be lost, by calculating the expected time until the effect is lost, and changing the process to be executed according to the expected time until the effect is lost.

In other words, because it is possible to adjust the suitable stimulus strength and the timing to apply a stimulus according to the degree of drowsiness of the driver, it is possible to increase the effects of eliminating drowsiness and reduce the trouble of applying the stimulus.

While the embodiment of the present invention has been described, the embodiment is merely an example, and is not intended to limit the scope and spirit of the invention. This novel embodiment may be implemented in various other forms, and various omissions, replacements, and modifications may be made without departing from the scope and spirit of the invention. The embodiment and the modifications are included in the scope and spirit of the invention, and are included in the invention described in the claims and their equivalents.

The invention claimed is:

1. A driving assistance device, comprising:
an acquisition unit that acquires a degree of drowsiness of a driver who is driving a vehicle, based on information on the driver being input;
a stimulating unit that applies a stimulus to the driver when the degree of drowsiness obtained by the acquisition unit becomes equal to or more than a predetermined threshold;
a calculation unit that calculates an expected time until an effect of an application of the stimulus on the driver is lost indicating an expected time when drowsiness is not eliminated despite the stimulus being applied to the driver; and
a control unit that
sets a timing and a strength of a next application of the stimulus performed on the driver based on the expected time, and
outputs a candidate of a rest station to which the vehicle is to be guided based on the expected time and a current position of the vehicle at a range that the vehicle is able to travel within the expected time.

2. The driving assistance device according to claim 1, wherein the acquisition unit acquires the degree of drowsiness, when the degree of drowsiness calculated from a pickup image of the driver picked up by an image pickup device becomes larger than the predetermined threshold.

3. The driving assistance device according to claim 1, wherein the acquisition unit acquires operation information indicating that a certain operation unit provided in the vehicle is operated, and the calculation unit calculates the expected time based on a time interval during which the operation unit is operated by the operation information.

4. The driving assistance device according to claim 1, wherein the predetermined threshold is changed according to the expected time until the effect is lost calculated by the calculation unit.

5. The driving assistance device according to claim 1, further comprising:

an output control unit that outputs a guidance to the driver when the degree of drowsiness obtained by the acquisition unit becomes equal to or more than a predetermined threshold, wherein control unit that changes the guidance output to the driver based on the expected time.

6. The driving assistance device according to claim 1, wherein the stimulating unit is provided in a back rest of a vehicle seat of the vehicle and applies a vibration as the stimulus.

7. The driving assistance device according to claim 1, further comprising:

a display that outputs a guidance to the driver when the degree of drowsiness obtained by the acquisition unit becomes equal to or more than a predetermined threshold, wherein the guidance includes the candidate of the rest station.

* * * * *